United States Patent

Schellekens et al.

[11] Patent Number: 5,676,612
[45] Date of Patent: Oct. 14, 1997

[54] PULLEY

[75] Inventors: Antonius Lambertus Schellekens, Tilburg; Sebastiaan Pieter Henricus Jozef Bongers, Nijmegen, both of Netherlands

[73] Assignee: Van Doorne's Transmissie B.V., Tilburg, Netherlands

[21] Appl. No.: 753,729

[22] Filed: Nov. 29, 1996

[30] Foreign Application Priority Data

Nov. 28, 1995 [NL] Netherlands .................... 1001756

[51] Int. Cl.⁶ .................................... F16H 61/00
[52] U.S. Cl. ............................... 474/18; 474/28
[58] Field of Search .................... 474/8, 16, 18, 474/28

[56] References Cited

U.S. PATENT DOCUMENTS

| | | |
|---|---|---|
| 4,504,246 | 3/1985 | Mott .................... 474/8 |
| 4,547,178 | 10/1985 | Hayakawa et al. .............. 474/28 X |
| 4,552,545 | 11/1985 | Koivunen .................... 474/16 |
| 4,722,718 | 2/1988 | Eugen .................... 474/28 X |
| 4,753,627 | 6/1988 | Kawamoto .................... 474/28 X |

FOREIGN PATENT DOCUMENTS

| | | |
|---|---|---|
| 0 180 089 | 5/1986 | European Pat. Off. |
| 0 321 921 | 6/1989 | European Pat. Off. |

*Primary Examiner*—Roger J. Schoeppel
*Attorney, Agent, or Firm*—Young & Thompson

[57] ABSTRACT

Pulley, in particular for a continuously variable transmission. The pulley is provided with two discs on a pulley shaft, at least one disc being axially movable relative to the other disc by means of control means. The movable disc is connected to the pulley shaft by means of a key/groove connection. A radially inward profile of the key/groove connection is connected to the disc, and a radially outward profile of the key/groove connection is connected to the shaft.

13 Claims, 2 Drawing Sheets

PULLEY

The invention relates to a pulley, in particular for a continuously variable transmission, provided with two discs on a pulley shaft, at least one disc being axially movable relative to the other disc by means of control means, and the movable disc being connected non-rotatably to the pulley shaft by means of a key/groove connection.

Such a pulley is known, for example from EPO.145.462, and is used in particular in continuously variable transmissions, which are used in, for example, motor cars. In a continuously variable transmission two pulleys, with a drive belt between them, are used. The transmission ratio of the transmission can be set by varying the radial position of the drive belt between the discs of the two pulleys. The radial position of the drive belt between the discs of the pulley can be altered by altering the mutual position of the discs of the pulley. For this purpose, at least one disc must be fixed non-rotatably, but in such a way that it is axially movable, on the pulley shaft. This can be achieved by, for example, using a key/groove connection. The control means generally comprise a piston/cylinder assembly. In the case of the known pulley according to EPO.145.462, the key/groove connection is a radially outward directed key/groove profile which is connected to the disc and interacts with a radially inward directed key/groove profile which is connected to the pulley shaft. The key/groove connection is in open communication with the cylinder chamber, so that the key/groove connection is always sufficiently lubricated. The known pulley according to EPO.145.462 has a number of disadvantages, four of which are preponderant. First, complex parts are necessary, and these make the pulley expensive. Secondly, the disc is provided with a sleeve to guide it over the pulley shaft. However, the pressure prevailing in the cylinder chamber is not exerted on the radial face of said sleeve, so that the disc has to be very large radially in order to obtain sufficient pressure on the disc. Thirdly, the use of a compensating chamber for compensation for the pressure produced in the cylinder chamber by the centrifugal effect is not possible, or requires considerable radial and axial fitting space. Fourthly, the use of a spring for pressing the movable disc in the direction of the other disc is possible only if there is considerable axial fitting space.

The object of the invention is in particular to overcome the abovementioned disadvantages. The pulley according to the invention is characterized in that the movable disc is immovably connected to a radially inward profile of the key/groove connection, and in that the shaft is immovably connected to a radially outward profile of the key/groove connection. No complex and expensive parts are necessary for the pulley according to the invention, while sufficient pressure can still be exerted on the disc, despite a limited fitting space.

According to the invention, the control means can comprise a piston/cylinder assembly, in which at least one cylinder is connected to the disc, and in which at least one piston is connected to the shaft. This produces a compact assembly of the disc and shaft with the control means, and also one which is simple to assemble.

The cylinder of the piston/cylinder assembly can be provided with a flange which extends axially, and wherein radially inwards, the flange is provided with the radially inward profile of the key/groove connection. This means that the cylinder and a part of the key/groove connection are simple to assemble or to produce as one part. Furthermore, the cylinder can be connected to a wall of a compensating chamber. The flange is preferably situated between the cylinder and the compensating chamber.

According to the invention, the piston can be connected to an axially extending piston sleeve, which piston sleeve is provided with the radially outward profile of the key/groove connection. This means that the piston and a part of the key/groove connection are simple to assemble or to produce as one part. The piston sleeve in this case can run into a radially inward directed part of the piston, which part is fixed on the pulley shaft.

By providing the disc with an axially extending disc sleeve which is situated fully inside the cylinder sealed off by the piston, optimum use is made of the available area to exert sufficient pressure on the disc, and the pulley can be of a compact design.

According to the invention, a spring can be fitted between the pulley shaft and the movable disc, which spring presses the movable disc in the direction of the other disc. A basic pressure on the movable disc is consequently guaranteed. In particular, radially outwards the spring can be confined by the piston sleeve, and radially inwards by the disc sleeve. The spring can rest against the radially inward directed part of the piston. This means that the spring requires only a limited fitting space.

The invention will be illustrated with reference to a drawing, in which.

Figure 1:
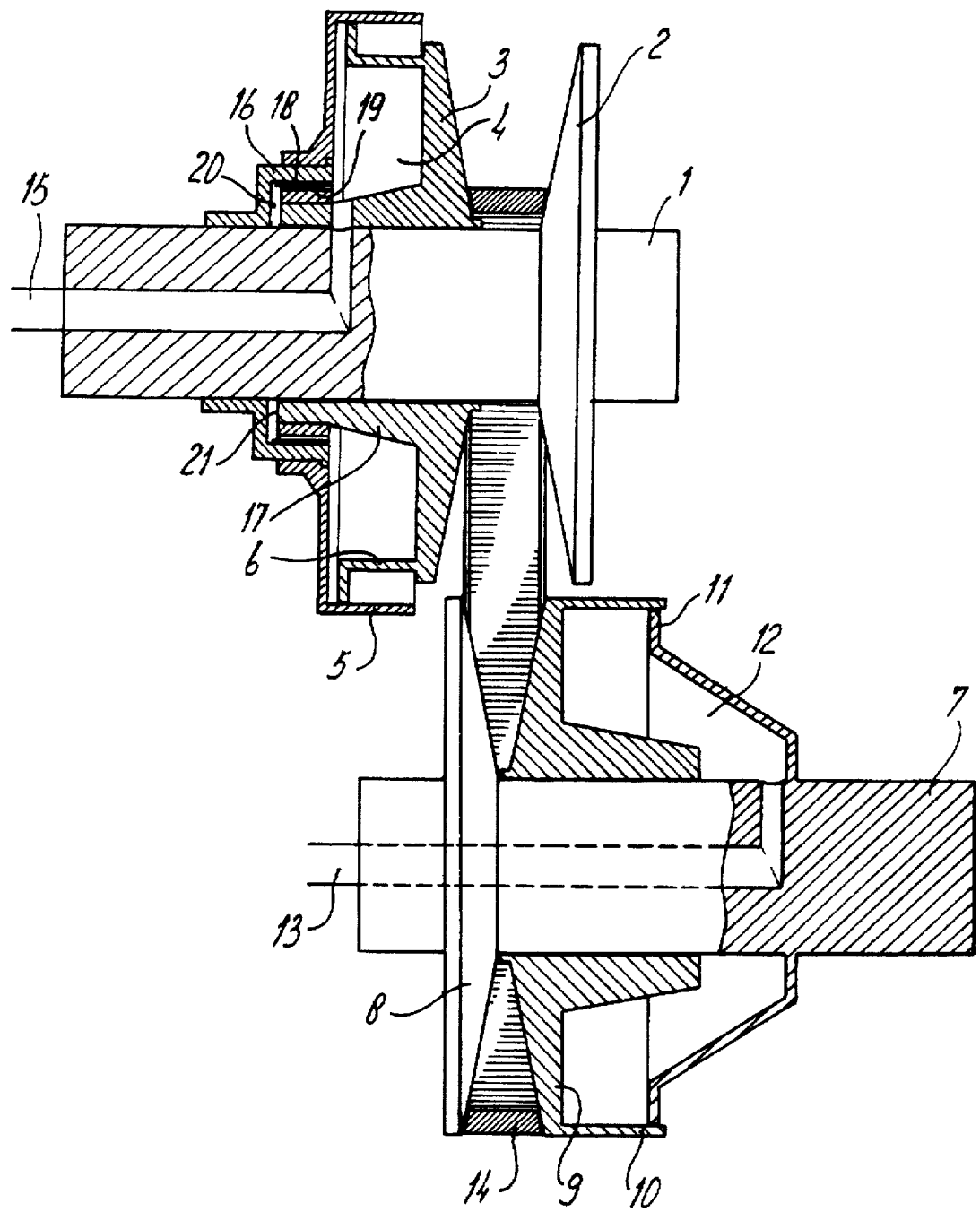
FIG. 1 shows diagrammatically a continuously variable transmission with a pulley according to the prior art.

The continuously variable transmission of FIG. 1 is provided with two pulleys according to the prior art. Fitted on the pulley shafts 1 and 7 are a fixed disc 2 and 8 respectively and an axially movable disc 3 and 9 respectively. A drive belt 14 is fitted between the discs 2, 3, 8 and 9. The movable discs 3 and 9 are provided with control means, in this case piston/cylinder assemblies 6, 5 and 11, 10 respectively, which enclose a cylinder chamber 4 and 12 respectively. When fluid is fed in and/or discharged in a suitable manner through the pipes 15 and 13, the quantity of fluid is varied in the cylinder chambers 4 and 12 respectively, in such a way that the movable discs 3 and 9 respectively assume the desired axial position. Said axial position in this case determines the radial position of the drive belt 14 between the discs 2, 3 and 8, 9 respectively, and consequently the transmission ratio of the transmission.

Although the discs 3 and 9 must be fitted so that they are axially movable, they must also be fixed non-rotatably on the pulley shaft 1 and 7 respectively. In the case of the movable disc 3, the movement is achieved, as in EPO.145.462, by using a key/groove connection. The cylinder 5 is immovably connected to the pulley shaft 1 by means of a flange 16 and is provided with a radially inward key/groove connection 18. The piston 6 is immovably connected to the disc 3. Said disc 3 is further connected to the sleeve 17 which provides for guidance of the disc 3 over the pulley shaft 1. The sleeve 17 is in turn provided with a radially outward directed key/groove profile 19. The key/groove connection 18, 19 is lubricated by leakage losses of fluid from cylinder chamber 4 to chamber 20. The construction is rather complex and expensive. Moreover, the sleeve 17 extends into chamber 20, so that the pressure of the cylinder chamber 4 is not exerted on the face 21 of the sleeve 17, and optimum use therefore cannot be made of the disc surface to press the disc by means of the fluid pressure in cylinder chamber 4 in the direction of the fixed disc 2. This can be overcome only by making the disc radially large, which is a disadvantage in terms of fitting space.

It is also not uncommon to use compensating chambers for pulleys. The fact is that, in addition to the preset pressure, pressure which builds up in the rapidly rotating cylinder chamber through the centrifugal effect occurs in the cylinder chamber 4. This centrifugal pressure upsets the preset pressure, so that a compensating chamber is commonly used to compensate for the centrifugal pressure. A spring is often used to press the disc with a certain basic force in the direction of the fixed disc 2. However, in the case of the illustrated pulley according to the prior art, the use of a compensating chamber and/or of a spring is very difficult or impossible, for example because it takes up considerable fitting space.

Figure 2:
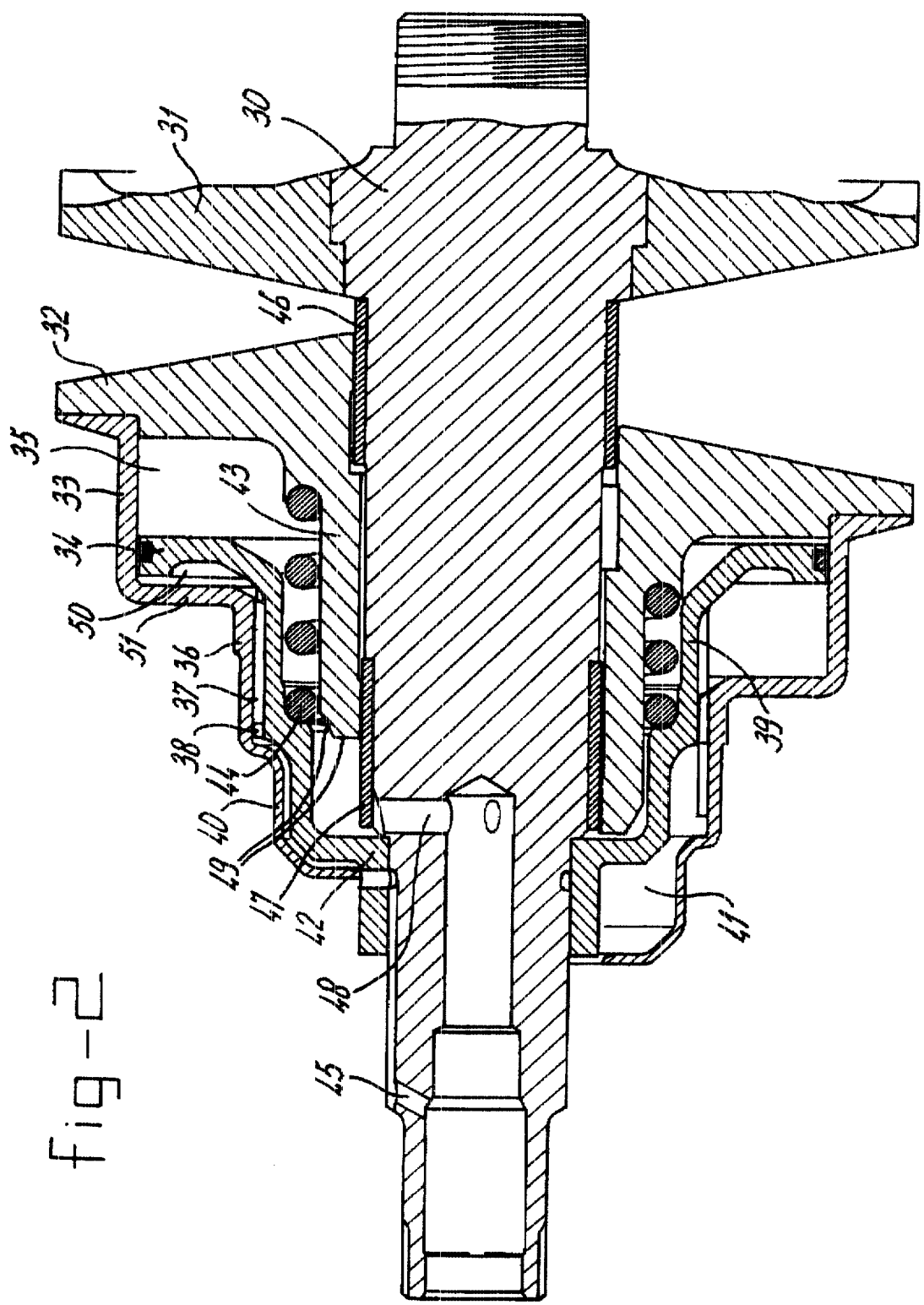
FIG. 2A shows diagrammatically half-view of an embodiment of the pulley according to the invention in a first operative position.
FIG. 2B is a view similar to FIG. 2A but showing the pulley in a second operative position.

FIGS. 2A and 2B show an embodiment of the pulley according to the invention, in half views, in two different operative positions, respectively. The pulley comprises a fixed disc 31 which is fitted on the pulley shaft 30, and a disc 32 which is movable axially over the pulley shaft 30. The pulley shaft 30 is also provided with two sliding rings 46 and 47 for the contact with the movable disc 32 and the disc sleeve 43 connected thereto. The movable disc 32 is provided with a cylinder 33. The piston 34 is fixed on the pulley shaft 30 by means of an axially extending piston sleeve 39 and a radially inward directed piston part 42. The cylinder 33 and the piston 34 enclose a cylinder chamber 35. The cylinder chamber 35 can be fed with fluid by way of bore 48 in the shaft 30. The cylinder 33 is provided with a radially inward key/groove profile 37 at the position of the axially extending flange 36. The piston 34 is provided with a radially outward profile 38 at the position of the piston sleeve 39. The radially inward key/groove profile 37 which is in engagement with the radially outward key/groove profile 38 allows an axial movement of the disc 32 relative to the pulley shaft 30, while the disc 32 is still non-rotatably connected to the pulley shaft 30. Comparison of FIGS. 2A and 2B shows the relationship of the profiles 37 and 38 relative to each other, in two different operative positions of the pulley. This construction is simple and relatively cheap, because the key/groove connection is fitted in the piston/cylinder combination already present, without expensive constructional measures and/or additional parts being necessary. Moreover, the two profiles can also be fitted in separate rings, which are in turn connected to the disc and the shaft respectively.

The disc sleeve 43 is situated fully inside the cylinder chamber 35, so that the pressure of the fluid in the cylinder chamber 35 is also exerted on the faces 49 of the disc sleeve 43. The faces 49 thus form an effective surface for increasing the force on the disc 32 in the direction of the fixed disc 31. This means that the radial size of the disc 32, and consequently the fitting space, can remain limited.

The spring 44 is confined radially inwards by the disc sleeve and radially outwards by the piston sleeve 39. The spring 44 rests against the radially inward directed piston part 42. The spring 44 consequently presses the disc 32 with a certain initial tension in the direction of the fixed disc 31, with the result that a certain force on the drive belt is always ensured, and the disc also constantly seeks to keep the smallest possible distance between the two discs 31 and 32. The use of the spring 44 is possible through the measure of the invention, and the spring 44 is fitted in a very compact way, and is also adequately confined and supported.

The cylinder 33 is connected to the wall 40 of the compensating chamber 41. Fluid at a relatively low pressure is introduced into compensating chamber 41 by way of bore 45 in the pulley shaft 30. Through the key/groove connection, fluid also leaks into and out of the compensating chamber 50. The key/groove connection is also lubricated in this way, so that it is guaranteed to function. Rotation of the pulley produces a centrifugal pressure in the chambers 41 and 50. The same centrifugal pressure also occurs in the cylinder chamber 35. However, the unwanted centrifugal pressure in cylinder chamber which presses the disc 32 in the direction of the fixed disc 31, is compensated for by the centrifugal pressure in the compensating chambers 40 and 50, which is exerted on cylinder wall 51 and the wall 40 in the direction facing away from the fixed disc 31. The use of the compensating chamber is possible through the measures according to the invention, and a very compact assembly is also produced.

For the rest, the term key/groove connection in the context of the invention should be understood as meaning any positive connection by means of corresponding shapes which permits an axial movement and is non-rotatable.

We claim:

1. Pulley, in particular for a continuously variable transmission, provided with two discs on a pulley shaft, at least one disc being axially movable relative to the other disc by means of control means, and the movable disc being connected non-rotatably to the pulley shaft by means of a key/groove connection, characterized in that the movable disc is immovably connected to a radially inward profile of the key/groove connection, and in that the shaft is immovably connected to a radially outward profile of the key/groove connection.

2. Pulley according to claim 1, characterized in that the control means comprise a piston/cylinder assembly, in which at least one cylinder is connected to the disc, and in which at least one piston is connected to the shaft.

3. Pulley according to claim 2, characterized in that the cylinder is provided with an axially extending flange, and in that radially inwards the flange is provided with the radially inward profile of the key/groove connection.

4. Pulley according to claim 2, characterized in that the cylinder is connected to a wall of one or more compensating chambers.

5. Pulley according to claim 4, characterized in that the flange is situated between the cylinder and the compensating chamber.

6. Pulley according to claim 2, characterized in that the piston is connected to an essentially axially extending piston sleeve, and in that the piston sleeve is provided with the radially outward profile of the key/groove connection.

7. Pulley according to claim 2, characterized in that the piston sleeve runs into a radially inward directed part of the piston, which part is fixed on the pulley shaft.

8. Pulley according to claim 2, characterized in that the radially inward and/or the radially outward profile is fitted in a separate ring, and in that said ring is connected to the disc and/or the shaft respectively.

9. Pulley according to claim 2, characterized in that the disc is provided with an axially extending disc sleeve, and in that said disc sleeve is situated fully inside the cylinder sealed off by the piston.

10. Pulley according to claim 1, characterized in that a spring is fitted between the pulley shaft and the movable disc, which spring presses the movable disc in the direction of the other disc.

11. Pulley according to claim 10, characterized in that radially outwards the spring is at least partially confined by the piston sleeve.

12. Pulley according to claim 10, characterized in that radially inwards the spring is partially confined by the disc sleeve.

13. Pulley according to claim 10, characterized in that the spring rests against the essentially radially inward directed part of the piston.

* * * * *